Nov. 10, 1959 C. B. BRAHM 2,911,790
COMPUTING DEVICE FOR FUEL CONTROL
Filed Jan. 27, 1956
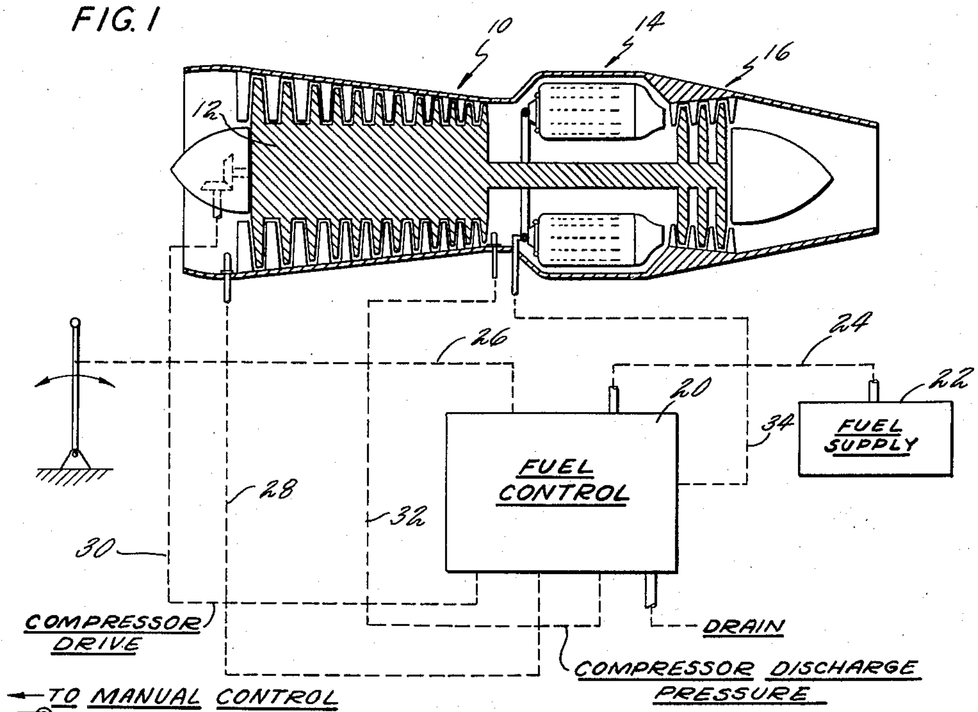
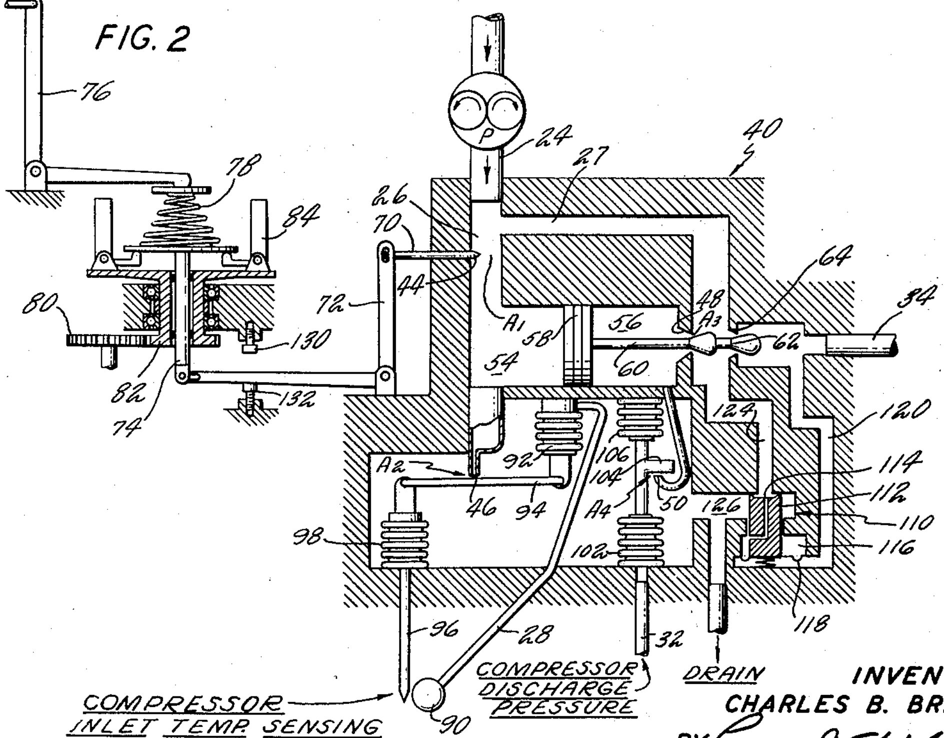
INVENTOR
CHARLES B. BRAHM
BY Leonard F. Wekelind
ATTORNEY 2,911,790
Patented Nov. 10, 1959

2,911,790

COMPUTING DEVICE FOR FUEL CONTROL

Charles B. Brahm, Windsor Locks, Conn., assignor to United Aircraft Corporation, East Hartford, Conn., a corporation of Delaware Application January 27, 1956, Serial No. 561,902

10 Claims. (Cl. 60—39.28)

The invention relates to hydraulic regulating devices and more specifically to a hydraulic computing device which is adaptable to fuel regulating mechanisms for turbine power plants.

It is an object of this invention to provide a hydraulic computing mechanism which receives several variable signals and transmits a final controlling signal having a predetermined relationship to the values of said variables.

It is a further object of this invention to provide a fuel control having a hydraulic system which receives three input signals and produces a final output signal for controlling fuel flow.

A still further object of this invention is to provide a fuel control having a hydraulic bridge circuit which receives various input signals corresponding to variables of power plant operation and produces a final controlling signal.

These and other objects of this invention will become readily apparent from the following detailed description of the drawing in which:

Fig. 1 is a schematic illustration of a power plant illustrating the various connections of the fuel control therewith.

Fig. 2 is a schematic diagram of the fuel control incorporating this invention.

The computing device of this invention has certain properties which may be best described in connection with one of its primary environments. Hence the function of the apparatus will be described hereinafter in connection with the fuel control of Fig. 2.

Referring to Fig. 1 a turbine type power plant is generally indicated at 10 as having a compressor 12, a combustion section generally indicated at 14 and a turbine section generally indicated at 16. The fuel control 20 receives fuel from a supply 22 via a line 24. The fuel control receives a power lever position signal via the line 26, a compressor inlet temperature signal via the line 28, a speed signal via the line 30 and a compressor discharge pressure signal via the line 32. The fuel control 20 receives these four major signals and in turn regulates the flow of fuel from the line 24 to the line 34 leading to the combustion section 14.

The fuel control 20 is generally indicated at 40 in Fig. 2. Fuel under pressure is fed to the control inlet via the line 24 and this flow divides into two major passages 26 and 27 which form parallel flow passages. The passage 26 conducts fuel to a first variable orifice 44 which has a variable area $A_1$ and then to a second variable area orifice 46 which has a variable area generally indicated as $A_2$. The other main passage 27 conducts fuel through a third orifice 48 which has a variable area generally indicated as $A_3$. The flow through the orifice 48 is also conducted to a fourth orifice 50 which has a variable area generally indicated as $A_4$.

The four orifices 44, 46, 48 and 50 regulate the pressures in the chambers 54 and 56 on either side of a servo piston 58. The position of the servo piston 58 sets the area of the orifice 48 by positioning of a stem 60 connected to the piston 58. The stem 60 at its right-hand extremity carries a contoured portion 62 which cooperates with orifice 64 which in turn controls the flow of fuel to the passage 34 leading to the combustion chamber 14 (Fig. 1) of the power plant.

The orifice 44 has its area $A_1$ varied in proportion to a speed error signal. Thus the arm 70 is movable to vary the area of the orifice 44 by means of a bell crank 72 which is in turn positioned by a vertical rod 74 in proportion to the speed error of the power plant. The manual control lever 76 will impose a speed setting on the speeder spring 78 while the speed of rotation of the power plant is fed as a signal to the gear 80 which via the sleeve 82 rotates the flyweights 84. Thus any off-speed condition of the power plant will be reflected by a new position of the rod 74, the bell crank 72, element 70 and hence a new value of the area $A_1$.

The area $A_2$ of the orifice 46 is varied in response to the compressor inlet temperature. Thus a temperature sensing bulb 90 is located at the inlet to the compressor and fluid within the bulb 90 will expand or contract to accordingly actuate a bellows 92. The bellows 92 will vary the right-hand end position of a rod 94 which acts as a flapper valve for the orifice 46 to vary the area $A_2$ thereof. A compensating line 96 is provided which in turn contains expandable fluid for operating a compensating bellows 98 which is operatively connected to the left-hand side of the lever 94. The compensating bellows 98 is intended to correct for any temperature variations which may occur between the point of sensing and the actual control point for the orifice 46.

The orifice 48 has its area $A_3$ varied in accordance with the position of the servo piston 58 in a manner described hereinbefore.

The orifice 50 has its area $A_4$ varied in accordance with compressor discharge pressure which is fed via the line 32 to a bellows 102. The bellows 102 imparts motion to an element 104 of the orifice 50, which element varies the area $A_4$. An evacuated bellows 106 is provided so that the signal fed to the orifice varying means is one proportional to compressor discharge pressure absolute.

The main throttle valve 64 has a pressure regulating valve generally indicated at 110 for maintaining the pressure drop across the throttle valve at a predetermined constant. The regulating valve element 112 contains a passage 114 which permits fuel under pressure from the upstream side of the throttle valve 64 to be conducted to the chamber 116 on the top side of a diaphragm 118. Fuel under pressure from the downstream side of the throttle valve 64 is led via a line 120 to the bottom side of the diaphragm 118. Thus when the pressure drop varies from the desired amount the regulator valve element 112 will vary the amount of bypass fuel from the line 124 to the chamber 126 which is under drain pressure.

The hydraulic system just described is in reality a self-balancing bridge which maintains its balance in spite of changes in the supply or drain pressures of the fuel they handle.

Since the same flow goes through orifice 44 and orifice 46, the pressure on side 54 of piston 58 will be a function of the supply pressure, the drain pressure, and the ratio of the areas of these orifices, or $A_1/A_2$. The pressure on side 56 of piston 58 is a function of the supply pressure, the drain pressure, and the ratio of the areas of the orifices 48 and 50, or $A_3/A_4$. For steady state conditions, the pressure on each side of the piston 58 will be approximately equal, so that the effect of variations in the supply pressure and/or the drain pressure are cancelled. Thus, the piston will move to a position such that the area ratio $A_1/A_2$ is equal to the area ratio $A_3/A_4$.

If area $A_1$ is proportional to speed error, $A_2$ is proportional to temperature correction, $A_3$ is proportional to fuel flow to the engine and $A_4$ is proportional to compressor discharge pressure, a desired relationship of the variables is achieved. In this connection it may be added that adjustable maximum and minimum limits for speed error may be provided by adjustable stops 130 and 132 which are intended to engage the horizontal leg of the bell crank 72 of the speed error mechanism. In this way the maximum and minimum fuel flow will be limited as a function of temperature and pressure to prevent compressor surge, overtemperature, or a loss of combustion.

As a result of this invention it is apparent that a simple yet highly accurate fuel controlling device and hydraulic computing mechanism has been provided for regulating turbine type power plants. Furthermore the device illustrated and described herein lends itself readily to use of parameters of power plant operation other than those specifically described herein.

Although one embodiment of this invention has been illustrated and described herein, it will be apparent that various changes and modifications may be made in the construction and arrangement of the various parts without departing from the scope of this novel concept.

What it is desired by Letters Patent is:

1. In a hydraulic regulating device having a flow regulating valve, a servo piston having two operative sides and operatively connected to said flow regulating valve to vary fluid flow therethrough, variable area orifice means responsive to a first variable for varying the pressure on one side of said piston, second variable area orifice means responsive to a second variable for further varying the pressure on said one side, means responsive to a third variable for varying the pressure on the other side of said piston, and means responsive to the position of said servo piston for further varying the pressure on the other side of said piston.

2. In a hydraulic regulating device having a variable opening flow regulating valve, a servo piston having two operative sides and operatively connected to said flow regulating valve to vary fluid flow therethrough, variable orifice means responsive to a first variable for varying the pressure on one side of said piston, second variable orifice means responsive to a second variable for further varying the pressure on said one side, and variable area orifice means responsive to the varied positions of said piston for further varying the pressure on the other side of said piston.

3. In a hydraulic regulating device having a flow regulating valve, a servo piston having two operative sides and operatively connected to said flow regulating valve to vary fluid flow therethrough, means responsive to a first variable for varying the pressure of one side of said piston, means responsive to a second variable for further varying the pressure on said one side, variable area orifice means responsive to a third variable for varying the pressure on the other side of said piston, and variable area orifice means responsive to the varied positions of said piston for further varying the pressure on said other side of said piston.

4. In a fuel regulating system for a turbo type power plant, said power plant including a compressor, a combustion section and a turbine, a source of fuel under pressure, fuel regulating means for varying the flow of fuel from said source to said combustion section, a servo device operatively connected to said fuel regulating means including two major operating sides, means responsive to speed of the power plant for controlling the pressure on one side of said servo device, means responsive to another parameter of power plant operation for further varying the pressure on said one operative side, means responsive to compressor discharge pressure to control the pressure on the other operative side of said servo device, and means responsive to the position of said servo device for further controlling the pressure on said other side of said servo device.

5. In a fuel system for a power plant, a source of fuel under pressure, means for regulating the flow of fuel from said source to the power plant, a servo device having two operative chambers, means for diverting a portion of said fuel flow to one of said chambers including valve mechanism for controlling the flow thereto, said valve having an opening varied in response to the speed of the power plant, means for controlling the outflow from said one chamber including an orifice whose opening is varied in response to a temperature of the power plant, means for further diverting a portion of said fuel flow to the other of said chambers including variable area valve mechanism for controlling the flow thereto and movable with said servo device, means for controlling the outflow from the other of said chambers, and an operative connection between said servo device and said flow regulating means for controlling the latter.

6. In a fuel system for a power plant, a source of fuel under pressure, means for regulating the flow of fuel from said source to the power plant, a servo device having two operative chambers, means for diverting a portion of said fuel flow to one of said chambers including valve mechanism for controlling the flow thereto, said valve having an opening varied in response to the speed of the power plant, means for controlling the outflow from said one chamber including an orifice whose opening is varied in response to a temperature of the power plant, means for further diverting a portion of said fuel flow to the other of said chambers including valve mechanism for controlling the flow thereto and responsive to the position of said servo device, means for controlling the outflow from the other of said chambers including an orifice whose area is varied in response to a pressure in the power plant, and an operative connection between said servo device and said flow regulating means for controlling the latter.

7. In a fuel system for a power plant, a source of fuel under pressure, means for regulating the flow of fuel from said source to the power plant, a servo device having two operative chambers, means for diverting a portion of said fuel flow to one of said chambers including valve mechanism for controlling the flow thereto, said valve having an opening varied in response to the speed of the power plant, means for controlling the outflow from said one chamber including an orifice whose opening is varied in response to a temperature of the power plant, means for further diverting a portion of said fuel flow to the other of said chambers including valve mechanism for controlling the flow thereto, said last mentioned valve being positioned by said servo device, means for controlling the outflow from the other of said chambers including an orifice whose area is varied in response to a pressure in the power plant, and an operative connection between said servo device and said flow regulating means for controlling the latter.

8. In a fuel system for a power plant, a source of fuel under pressure, means for regulating the flow of fuel from said source to the power plant, a servo device having two operative chambers, means for diverting a portion of said fuel flow to one of said chambers including valve mechanism for controlling the flow thereto, said valve having an opening varied in response to the speed of the power plant, means for limiting the opening of said valve, means for controlling the outflow from said one chamber including an orifice whose opening is varied in response to a temperature of the power plant, means for further diverting a portion of said fuel flow to the other of said chambers including valve mechanism for controlling the flow thereto and responsive to the position of said servo device, means for controlling the outflow from the other of said chambers, and an operative connection between said servo device and said flow regulating means for controlling the latter.

9. In a fuel system for a power plant, a source of fuel under pressure, means for regulating the flow of fuel from said source to the power plant, a servo device having two operative chambers, means for diverting a portion of said fuel flow to one of said chambers including valve mechanism for controlling the flow thereto, said valve having an opening varied in response to the speed of the power plant, means for limiting the maximum and minimum opening of said valve including a pair of adjustable stops, means for controlling the outflow from said one chamber including an orifice whose opening is varied in response to a temperature of the power plant, means for further diverting a portion of said fuel flow to the other of said chambers including valve mechanism for controlling the flow thereto and movable with said servo device, means for controlling the outflow from the other of said chambers including a variable area orifice, and an operative connection between said servo device and said flow regulating means for controlling the latter.

10. In a fuel system for a power plant, a source of fuel under pressure, means for regulating the flow of fuel from said source to the power plant, a servo device having two operative chambers, means for diverting a portion of said fuel flow to one of said chambers including valve mechanism for controlling the flow thereto, said valve having an opening varied in response to the speed of the power plant, means for limiting the opening of said valve, means for controlling the outflow from said one chamber including an orifice whose opening is varied in response to a temperature of the power plant, means for further diverting a portion of said fuel flow to the other of said chambers including valve mechanism for controlling the flow thereto, said last mentioned valve being positioned by said servo device, means for controlling the outflow from the other of said chambers including an orifice whose area is varied in response to a pressure in the power plant, and an operative connection between said servo device and said flow regulating means for controlling the latter.

References Cited in the file of this patent

UNITED STATES PATENTS

| | | |
|---|---|---|
| 2,691,961 | Harris | Oct. 19, 1954 |
| 2,703,961 | Harding | Mar. 15, 1955 |
| 2,746,247 | Bevins | May 22, 1956 |
| 2,761,495 | Greenland | Sept. 4, 1956 |

FOREIGN PATENTS

| | | |
|---|---|---|
| 698,281 | Great Britain | Oct. 14, 1953 |